United States Patent Office 3,067,542
Patented Dec. 11, 1962

3,067,542
TOP DRESSING TREATENT FOR SOIL
Norman Lewis O'Brien, 101 Euclid Ave., Somerset, Mass.
No Drawing. Filed Jan. 2, 1959, Ser. No. 784,428
5 Claims. (Cl. 47—9)

This invention relates to the treatment of agricultural soil in order to promote and stimulate plant growth and is more particularly concerned with the provision of a novel and improved protective covering for the top of the soil.

A primary object of the instant invention is the provision of a protective covering for agricultural soil which will function to effectively insulate the soil whereby to maintain a more constant soil temperature.

Another important object of my invention is the provision of a protective covering which maintains the top of the soil soft and moist, thereby preventing an undesirable dry crust from forming at the upper soil level.

A further object is the provision of a protective coating which is effective for both indoor and outdoor plant life.

Another object of my invention is the provision of a top protective coating for agricultural soil which may simultaneously function as a retainer for fertilizer and/or insecticide, in addition to accomplishing the other objects hereinbefore enumerated.

An additional object of my invention is the provision of a top soil protective coating which may be used to greatly enhance the desirability of indoor plants, by making said indoor plants more attractive in appearance and odor.

These and other objects of my invention will become more apparent from the following specification.

In applicant's United States Patent No. 2,848,840, it was pointed out that greatly advantageous results were received by impregnating agricultural soil with a coarsely granulated foamed rubber latex or the like, said impregnation being expressly below the top level of the soil. The unusual characteristic of granular foamed rubber latex-like material wherein the material compresses upon absorption of moisture and expands when giving off moisture or drying has been found to be extremely advantageous in aerating the soil and maintaining it soft and moist when impregnated in the manner afore-described. It has now been found, however, that advantageous results are also achieved when granular foamed rubber latex-like material is placed on the top of the soil. Where the soil is located outdoors and is exposed to the rays of the sun, it has been found that natural foamed rubber latex and even various synthetic latices are deteriorated and decomposed by sunlight and ozone, thereby diminishing the hereinafter to be described advantages which result from the application of a material of this type to the top of the soil. It has been found, however, that certain synthetic granular plastic foams, such as polyurethane, are less susceptible to ozone attack or decomposition from the rays of the sun even though otherwise possessing substantially the same physical characteristics as granular natural rubber foam, i.e., the faculty of contracting upon absorption of moisture and expanding upon drying. Thus, for outdoor applications where the top surface of the agricultural soil is to be covered in accordance with the instant invention, I prefer to use a granular synthetic plastic foam, such as polyurethane. For indoor applications, on the other hand, such as indoor plants, the mounting of cut flowers and the like, any granular foam having substantially the afore-described physical characteristics of rubber latex may be satisfactorily used.

In operation, it is essential that the foamed rubber latex or equivalent material be granular, although the exact size of the granules is not critical. The only thing that is important is that the granules be applied to the top of the soil so as to completely cover and blanket same, it being understood that where the granular foam is sprinkled over the top of the soil in an indoor plant or the like, it is a simple matter to effectively cover the soil since the granules may be easily sprinkled in and around the upwardly extending stems of the plant. This overcomes a very definite problem which existed in the prior art wherein it was customary to apply sponge rubber slabs or sheets to the top of the soil, it being virtually impossible to carry out such a principle in connection with indoor plants due to the obvious difficulty of covering the soil in and around the plant stems.

When applying the granular foam to the soil top, and once again reference is made primarily to indoor plants and the like, I prefer to utilize colored granules whereby any desired color scheme may be established thereby adding to the attractiveness of the plant and further enabling an attractive blending to take place with the color scheme of the surrounding room. It is also within the scope of my invention to impregnate the foam granules with a perfume or the like, thereby enabling my protective covering to simultaneously function as a sachet.

It has been found that the application of a granular foamed rubber latex-like material to the top level of agricultural soil so as to completely cover same provides numerous advantages, the more important of which are as follows:

(1) Insulates the soil against varying temperature conditions whereby to maintain a more constant soil temperature.

(2) When watered down, the granular foam maintains moisture for long periods of time, said moisture being absorbed by the soil as it needs it.

(3) Prevents the surrounding air from drying the crust of the soil, thereby maintaining the soil top soft and moist.

(4) When watered down, the granular foam functions to humidify the surrounding air thereby counteracting the drying effect of artificial heating means and the like. This humidification of the adjacent and surrounding air is of great importance in the stimulation and growth of house plants.

(5) Protects plant foliage from toxic materials which rise to the surface of the soil and adhere to the rim of the plant pot when sub-irrigation method of watering is used. This is because the granular foam forms a protective covering for the plant foliage when said foam is maintained dry as it obviously would be where sub-irrigation is being utilized.

(6) It is pointed out that the foamed rubber latex or equivalent material utilized in my invention may be impregnated with liquified chemical fertilizers, insecticides, fungicides, and the like to further protect and stimulate the plant growth.

Although my invention is primarily applicable to agricultural soil, and has been hereinbefore so described, it will be understood that I am aware of other uses of granular foamed rubber latex or equivalent materials. More specifically, granular foam of the type characterized by my invention may be impregnated with fertilizers or the like and then utilized to support, nourish and propagate bulbs, plants, shrubs and trees in water. By the same token, granular foam of the type herein discussed may be utilized in connection with the mounting and display of artificial or cut flowers since the foam will not only function as a physical support for maintaining the flowers in a desired position, but it will also maintain moisture and air for absorption by the cut flowers whereby to lengthen their life. Here again, the foam rubber latex or the like may be gaily colored for decorative purposes and at the same time impregnated with fertilizers, insecticides, fungicides and the like for promotion and stimulation of flower growth.

Granular foam in accordance with the instant invention has also been found to be of value as a protective medium during the transporting and shipment of various types of plants, bulbs, shrubs and trees.

It is once again emphasized that the foregoing objects and advantages are successfully accomplished as a result of the inherent characteristic of granular foamed rubber latex or the equivalent to contract upon absorption of moisture and to expand upon drying. This characteristic enables the plastic foam to accomplish the advantageous and unexpected results hereinbefore enumerated when placed on the top of the soil, just as impregnation of this material within the soil obtains the other results and advantages listed in my aforesaid United States Patent No. 2,848,840.

Having thus fully described the invention, what I claim is new and desire to secure by Letters Patent is:

1. Agricultural soil treatment for the promotion of plant life in the soil comprising the application of a granular foamed rubber latex-like material to the top surface of the soil, said material being applied in sufficient quantity so as to substantially completely cover the top surface of the treated soil.

2. Agricultural soil treatment for the promotion of plant life in the soil comprising the application of colored granules of a material having substantially the characteristics of foamed rubber latex to the top surface of the soil so as to substantially completely cover said soil.

3. Agricultural soil treatment for the promotion of plant life in the soil comprising the application of a granular foamed rubber latex-like material to the top surface of the soil so as to substantially completely cover said soil, said material being impregnated with a fertilizer.

4. Agricultural soil treatment for the promotion of plant life in the soil comprising the application of a granular foamed rubber latex-like material to the top surface of the soil so as to substantially completely cover said soil, said material being impregnated with an insecticide.

5. Agricultural soil treatment for the promotion of plant life in the soil comprising the application of a granular foamed rubber latex-like material to the top surface of the soil so as to substantially completely cover said soil, said material being impregnated with a fungicide.

References Cited in the file of this patent

UNITED STATES PATENTS

| | | |
|---|---|---|
| 1,882,377 | Whittelsey | Oct. 11, 1932 |
| 2,618,901 | Braun | Nov. 25, 1952 |
| 2,753,277 | Smithers | July 3, 1956 |
| 2,891,355 | Nelson | June 23, 1959 |
| 2,945,322 | Gaeth | July 19, 1960 |
| 2,971,292 | Malecki | Feb. 14, 1961 |

FOREIGN PATENTS

| | | |
|---|---|---|
| 839,944 | Germany | May 26, 1952 |
| 920,487 | Germany | Nov. 22, 1954 |

OTHER REFERENCES

1950 Modern Plastics Encyclopedia and Engineers' Handbook, published by Plastics Catalogue Co. (N.Y.), 1950, pages 800 and 801, article "Expanded Plastics."

Modern plastics (magazine), vol. 28, No. 2, October 1950, pages 2, 83, 84, 85, 86, 166, 167, article "Foam and the Future."

Youngman: "Gardens—Gardeners Learn Value of Mulch in D.C. Area," published June 3, 1956, in Sunday Star (newspaper) Washington, D.C., page E-7.

Tschirhart: "Substitutes for Sand and Propagating Cuttings," published July 25, 1952, in Southern Florist and Nurseryman (magazine), vol. 65, No. 18, pages 85, 86, 87.

The New Garden Encyclopedia, published 1941, by Wm. H. Wise and Co., New York, pages 835, 836, 837, 1233, articles on Mulch and on Top-Dressing.

Taylor: "Encyclopedia of Gardening," published by Houghton Mifflin (Boston), 1957, third edition, pages 709, 710, 1120, articles on Mulch and on Top-Dressing.